United States Patent [19]

Cassidy et al.

[11] Patent Number: 4,583,852
[45] Date of Patent: Apr. 22, 1986

[54] ATTITUDE TRANSFER SYSTEM

[75] Inventors: Lawrence W. Cassidy, New Milford; Douglas R. Everhart, Danbury, both of Conn.

[73] Assignee: The Perkin-Elmer Corporation, Norwalk, Conn.

[21] Appl. No.: 481,027

[22] Filed: Mar. 31, 1983

[51] Int. Cl.$^4$ .................. G01B 11/26; G01C 1/00
[52] U.S. Cl. .................. 356/152; 356/354; 356/363
[58] Field of Search .............. 356/152, 354, 356, 363; 244/3.13, 3.16

[56] References Cited

U.S. PATENT DOCUMENTS

| | | | |
|---|---|---|---|
| 3,532,892 | 10/1970 | Murphy | 356/152 |
| 3,552,857 | 1/1971 | Hock et al. | 356/152 |
| 3,658,427 | 4/1972 | DeCou | 356/152 |
| 4,047,816 | 9/1977 | Pell et al. | 356/152 |
| 4,131,365 | 12/1978 | Pryor | 356/356 |

*Primary Examiner*—S. C. Buczinski
*Assistant Examiner*—Linda J. Wallace
*Attorney, Agent, or Firm*—Thomas P. Murphy; Edwin T. Grimes; Richard C. Wilder

[57] ABSTRACT

A system for measuring the relative orientation between two objects. A transmitter/receiver assembly on one of the objects transmits a beam of monochromatic light to a Ronchi-type retro-grating disposed on the other object. The grating reflects the light back to one or more charge transfer device area arrays in the transmitter/receiver assembly which provides orientation data to a computer which determines relative pitch, yaw and roll between the two objects.

10 Claims, 4 Drawing Figures

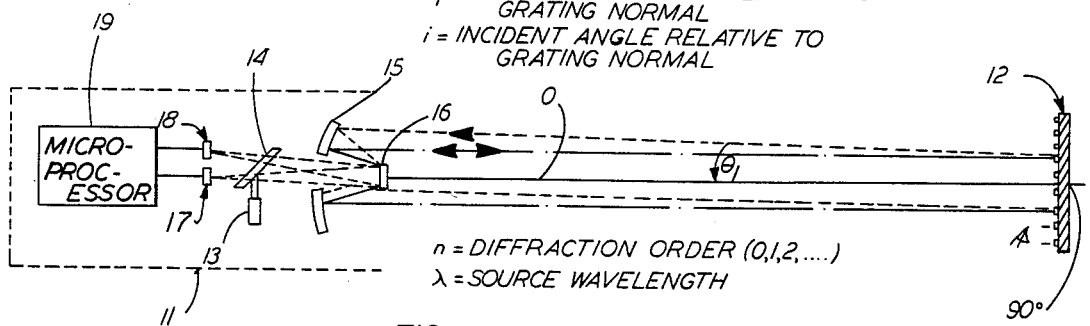
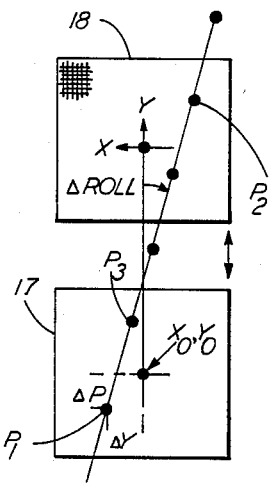
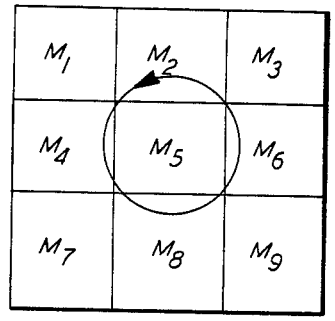
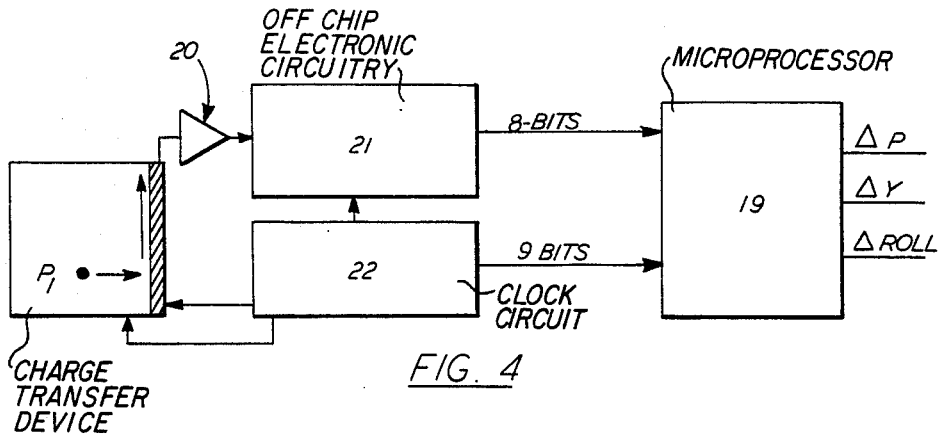

4,583,852

ATTITUDE TRANSFER SYSTEM

BACKGROUND OF THE INVENTION

Precise information of relative attitude between remote objects is necessary for a variety of reasons. For instance, in a spacecraft it is often important to determine variances in attitude between the inertial reference platform and objects such as boom mounted, steerable antennas, remote sensor platforms and STS pallet-mounted experiments to name a few. Such attitude information is necessary so that data received from or provided to such objects may be corrected or calibrated for relative deviation in attitudes between the inertial reference platform and the object of interest.

Use of star trackers or gyros to obtain attitude information for individual objects is often prohibitive in cost as well as space and weight requirements. Thus, systems which measure attitude without the necessity that each object include its own attitude sensing apparatus are highly desirable and, in fact, are in existence today.

One such system requires two transmitter/receiver assemblies mounted, e.g., on the inertial reference platform. One transmitter/receiver measures pitch and yaw through autocollimation by reflecting a beam of monochromatic light from a mirror mounted on the remote platform whose attitude is to be measured. Sensors in the transmitter/receiver provide information of the pitch and yaw. The second transmitter/receiver is necessary to determine roll of the remote platform.

A second system ultilizes a single transmitter/receiver. Pitch and yaw are obtained as above but roll is obtained through the use of an active source which must be mounted on the remote platform to direct a beam of polarized light back to the transmitter/receiver.

The present invention is an improvement over the above described systems and requires only a single transmitter/receiver on the inertial reference platform without the necessity of active sources mounted on the remote platform.

BRIEF SUMMARY OF THE PRESENT INVENTION

The present invention relates to a three axis attitude transfer system for measuring pitch, yaw and roll of a remote object or platform relative to a reference platform. More particularly, the present invention comprises a transmitter/receiver assembly disposed on the reference platform. The transmitter/receiver assembly includes means for transmitting a beam of monochromatic light to a ruled reflection grating on the remote platform. The grating reflects the beam as a fan of collimated light bundles of varied intensity. These return light bundles which are dispersed from the grating lie in a plane which is orthongonal to the rulings of the grating. The reflected beams fall on a sensor in the transmitter/receiver assembly. The sensor which may comprise one or more charge transfer device (CTD) area arrays provides data to a computer which centroids all detected images in accordance with a specified algorithm to provide pitch and yaw information from the location of the zero order beam relative to the coordinates of the sensor area array and roll information from the angle between the best fit straight line through the image locations and the sensor array coordinate system.

BRIEF DESCRIPTION OF THE DRAWINGS

FIG. 1 is a schematic representation of an embodiment of the present invention;

FIG. 2 is a schematic representation of the sensor arrangement of the present invention and the line of reflected beams;

FIG. 3 is a graphic representation of a reflected light beam falling on a portion of an area array useful in understanding the present invention; and FIG. 4 is a block diagram illustrating the circuitry for calculating pitch, yaw and roll in the present invention.

DESCRIPTION

FIG. 1 shows a transmitter/receiver assembly 11. The transmitter/receiver assembly 11, hereinafter referred to as transceiver 11, is normally mounted within an inertial reference platform of the type used in spacecraft for determining position and attitude in space.

The remote platform whose attitude is to be meaured has a ruled grating 12 of the Ronchi type fixed thereto. The remote platform is generally located some distance from the inertial reference platform. It may be within the spacecraft such as a remote sensor platform or outside the spacecraft such as an antenna controlled from the spacecraft by means of a boom. In any event the remote platform is subject to variations in pitch, yaw and roll relative to the inertial reference system due to racking, vibrations and the like to which the spacecraft may be subject.

The transceiver 11 comprises means for transmitting a beam of monochromatic light to the grating 12 where it is diffracted and reflected back to the transceiver as a fan of light bundles or beams of varying intensities and orders.

In particular, the transceiver 11 comprises a laser source 13, a beamsplitter 14 and a pair of mirrors 15 and 16. The mirror 15 has a concave surface facing the convex surface of mirror 16. As can be seen in FIG. 1 mirror 15 has a central opening with mirror 16 disposed with its optical axis coincident with that of mirror 15. The beamsplitter 14 is positioned relative to laser source 13 and mirrors 15 and 16 so that a laser beam from the laser source 13 reflects from beamsplitter 14 and mirrors 15 and 16 to be directed toward grating 12. The optics for transmitting the beam are conventional and their function may be carried out by other conventional optics such as a refractive lens system.

The transceiver 11 further comprises a pair of identical charge transfer device area arrays 17 and 18 disposed in the same plane one above the other for receiving the fan of light bundles or beams reflected from line grating 12. The charge transfer device area arrays 17 and 18 are commercially available devices and are available, e.g., from the General Electric Company. Each of the arrays 17 and 18 may, e.g., comprise up to five hundred pixels per side. The array of pixels is partially shown in the upper left hand corner of CTD array 18 shown in FIG. 2. Each pixel area is an individual light sensor and provides an output voltage representative of the intensity of the light incident thereon.

As seen in FIG. 1 the laser beam shown by solid lines is transmitted to line grating 12 of the remote platform. The zero order reflected beam returns to the transceiver and passes through the optics of mirrors 15 and 16 and beamsplitter 14 to be focused at point $P_1$ on CTD area array 17 as shown in FIG. 2.

FIG. 1 also shows one of the diffracted orders of beams in dashed lines reflected by the line grating 12. This order is reflected at an angle $\theta$, with respect to the optical axis so that it is directed back through the optics to focus as point $P_2$ on CTD area array 18 shown in FIG. 2. Of course, the fan of light bundles reflected from line gratings are numerous some of which are shown as dark dots in FIG. 2. The fan of light bundles are by definition orthogonal to the direction of lines on line grating 12. This relationship remains true even though the remote platform may deviate in pitch, yaw and roll relative to the inertial reference platform which contains the transceiver 11. Thus, the angle that the line of images of the light bundles makes with the Y axis of the CTD arrays 17 and 18 provides roll information. The position of the zero order image $P_1$ with respect to the center of CTD array 17 provides pitch and yaw information to better than one arcsecond of accuracy. The two extreme reflected bundles of light $P_1$ and $P_2$ in FIG. 2 provide sufficient information to obtain roll to less than one arcsecond of accuracy. Points $P_1$ and $P_3$ on CTD area array 17 are sufficient to give roll information to about 8 arcseconds permitting CTD area array 18 to be eliminated if roll accuracy of 8 arcseconds is adequate. This, accuracy in roll measurement is a function of the distance between CTD area arrays 17 and 18 with accuracy increasing as the distance therebetween is increased. In a practical embodiment each CTD area array is 0.4 inches square with the overall separation between the two arrays capable of being varied over a range of several inches.

The CTD area arrays provide data inputs to a microprocessor, e.g., a Motorola MC 68000 which centroids all detected images to derive pitch and yaw information from the location of point $P_1$ and roll information from the angle between the line joining points $P_1$ and $P_2$ and the array coordinate system.

As seen in FIG. 3 each reflected bundle of light overlaps several pixel areas on the CTD area array 17 and 18. This permits use of a standard center of mass algorithm programmed into the microprocessor to determine the centroid of the returning bundle of light relative to the coordinate system of the CTD area arrays 17 and 18.

As is well known, each pixel area of a CTD area array acts as a light collector. Thus, when the pixels of a CTD area array are turned on for its integration period which may last, e.g. a tenth of a second, photons of the light falling on a pixel area are converted to electrons and accumulated in each pixel in proportion to the local light intensity. After the integration period when all the pixels of a CTD area array are turned off the accumulated charge is automatically transferred out to the utilization device which in the present invention is microprocessor 19.

Considering the $3 \times 3$ pixel matrix of FIG. 3 it is seen that a bundle of light reflected from line grating 12 may be imaged at a random location on either CTD 17 or 18 and each image may overlap up to nine pixels $M_1$–$M_9$. By comparing the light collected in each of the pixels relative to the others, the centroid given by coordinates $\overline{X}$ and $\overline{Y}$ may be found.

This calculation may be performed in a microprocessor by a single center of mass algorithm substituting the amount of light collected by each pixel (and digitally encoded) for mass. Thus, the algorithm:

$$\overline{X} = \frac{\sum_{i=1}^{9} X_i M_i}{\sum_{i=1}^{9} M_i}$$

$$\overline{Y} = \frac{\sum_{i=1}^{9} Y_i M_i}{\sum_{i=1}^{9} M_i}$$

where $\overline{X}$ and $\overline{Y}$ are the image location coordinates of points $P_1$ $M_i$ are the signals integrated within each sampled pixel, and $X_i$ and $Y_i$ are the coordinates of each sampled pixel's center.

may be used to determine the centroid of point $P_1$ which provides the pitch and yaw information of the remote platform. The centroids of points $P_1$ and $P_2$ which provide roll information of the remote platform.

In particular to derive the relative pitch and yaw angles the microprocessor performs the following algorithm using point $P_1$ centroid coordinates $$\text{Relative Pitch} = \Delta_P = \tan^{-1}\left(\frac{\overline{Y} - Y_o}{F}\right)$$

$$\text{Relative Yaw} = \Delta_Y = \tan^{-1}\left(\frac{\overline{X} - X_o}{F}\right)$$

where, $\overline{Y} - Y_0$ is the distance of the $P_1$ image centroid from the center of CTD 17 measured in micrometer units along the Y axis.

$\overline{X} - X_o$ is the distance of the $P_1$ image centroid from the center of CTD 17 measured in micrometer units along the X axis, F is the effective focal length of the transceiver optical system (15 and 16) measured in micrometer units.

The location $X_o$, $Y_o$ is a data base item stored in the microprocessors memory along with other calibration data including the value of F.

To obtain the relative role angle the microprocessor implements the following algorithm $$\text{Relative Roll} = \Delta_{Roll} = \tan^{-1}\left(\frac{\overline{X}_2 - \overline{X}_1}{\overline{Y}_2 - \overline{Y}_1}\right)$$

where, $\overline{X}_2 - \overline{X}_1$ is the separation between the centroid locations of images $P_2$ and $P_1$ measured along the X axis, $\overline{Y}_2 - \overline{Y}_1$ is the separation between the centroid locations of images $P_2$ and $P_1$ measured along the Y axis The data collected by CTD area arrays is transferred to microprocessor 19 at the end of each integration period and may be updated at rates up to 30 Hz.

During the transfer process photoelectrons generated within each pixel during the previous integration period are transferred in bucket brigade fashion to an output preamplifier (20) shown in FIG. 4 on each CTD area array. Here each charge packet is amplified and is then filtered and encoded into one of 255 digital values (8-bit quantization) via off chip electronic circuitry (21). The digital values (typically 9 from image $P_1$ and 9 from image $P_2$) are then passed to the microprocessor (19) for the computation of pitch, roll and yaw. Along with these digitized signals, the address of each sampled pixel (two 9-bit words per pixel, one word denoting the X coordinate of the pixel and one word denoting the Y coordinate of the pixel) are forwarded to the microprocessor. Time information in the form of a digital word provided by a clock circuit (22) completes the information needed for alignment computation.

The present invention, of course, is not limited to spacecraft but may find use in other vehicles, e.g., aircraft, land vehicles and where the remote object or platform is located internally or externally to the vehicle.

Other modifications of the present invention are possible in light of the above description which should not be construed as placing limitation beyond those set forth in the claims which follow:

What is claimed is:

1. A system for determining attitude of a first object relative to a second object comprising:
    first means on said first object for transmitting a beam of monochromatic light,
    lines grating means on said second object disposed in the path of said beam of monochromatic light for reflecting said beam of monochromatic light as a diffracted fan of collimated light bundles back to said first means,
    said first means including sensor means having a face disposed in the path of said reflected bundles of light for determining pitch, yaw and roll based on the position of said light bundles falling on said face of said sensor means.

2. A system according to claim 1 wherein said reflected bundles of light comprise one bundle of zero order and other bundles of ascending orders.

3. A system according to claim 2 wherein said reflected bundles of light form a line orthogonal to the lines of said line grating means.

4. A system according to claim 3 wherein said sensor means includes,
    at least one charge transfer device area array disposed in the path of said reflected bundles of light for sensing the light intensity of said zero order and some of the other orders of said bundles of light.

5. A system according to claim 4 wherein said first object is an inertial reference platform.

6. A system according to claim 5 wherein said sensor means includes second means for determining the centroid of selected ones of said reflected bundles of light falling on said face of said sensor means.

7. A system according to claim 6 wherein said first means includes,
    optical means for transmitting said beam of monochromatic light and focussing said reflected bundles of light on said face of said sensor means.

8. A system according to claim 7 wherein said line grating means comprises,
    a ruled reflection grating of the Ronchi type fixed to said second object in the path of said monochromatic beam of light.

9. A system according to claim 8 wherein said face of said charge transfer device area array comprises,
    a matrix of light collecting pixel elements arranged in an X-Y coordinate system.

10. A system according to claim 9 wherein said second means comprises,
    a microprocessor for determining the position of said first order reflected light bundle relative to the coordinate system of said matrix and of the angle a line connecting the two extreme bundles of light falling on said matrix makes with the coordinate system of said matrix.

* * * * *